2,179,255

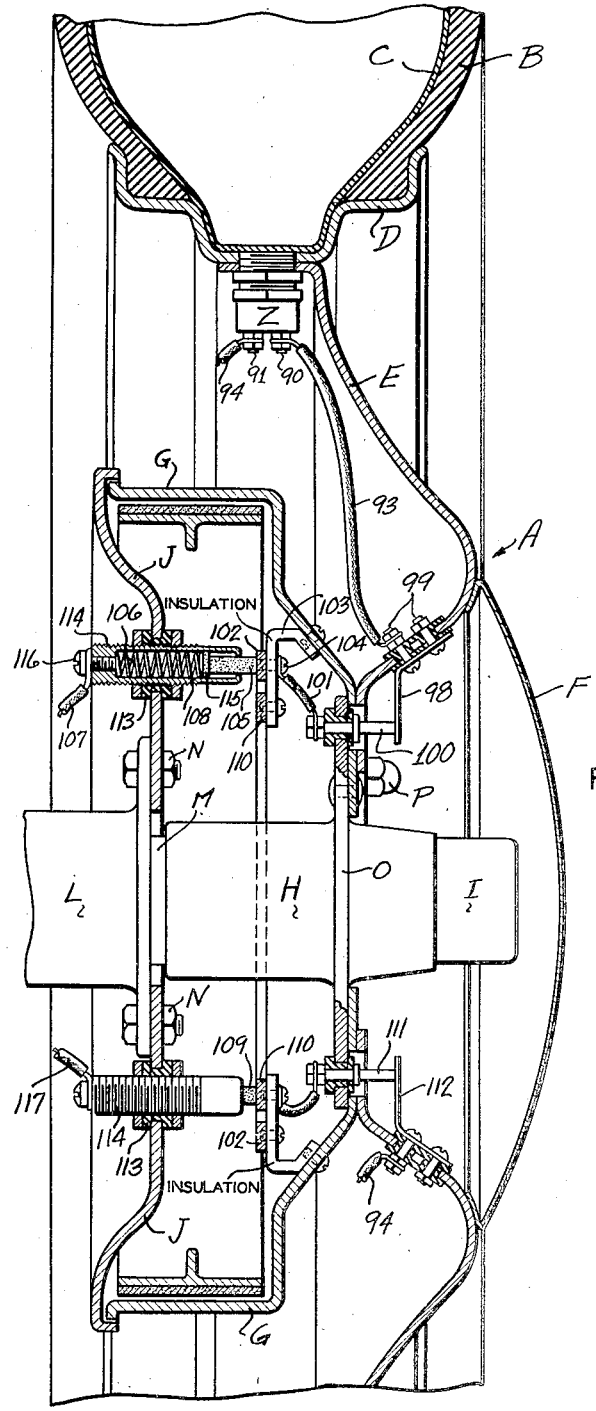

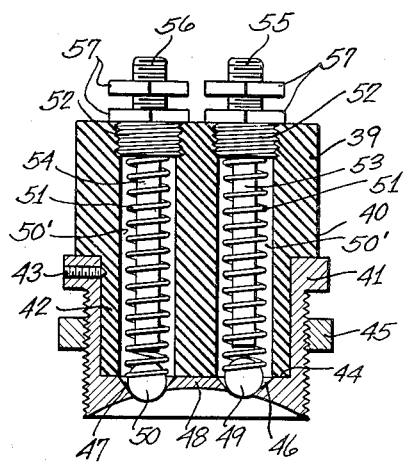
FIG. 7.
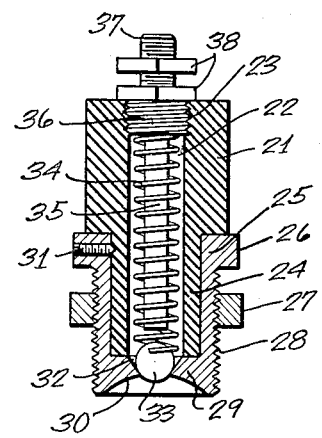
FIG. 8.
FIG. 9.
INVENTOR
ALLIE EDMONSTON
BY
ATTORNEY Patented Nov. 7, 1939

UNITED STATES PATENT OFFICE 2,179,255

PRESSURE INDICATOR

Allie Edmonston, Wellston, Mo., assignor to Aï Pressure Indicators, Inc., St. Louis, Mo., a corporation Application May 23, 1938, Serial No. 209,446

5 Claims. (Cl. 200—58)

My invention relates generally to pressure indicators, and more particularly to air pressure indicators whereby under-inflation as well as over-inflation is indicated at a predetermined point. As a matter of convenience, I have shown my pressure indicator applied to a motor vehicle tire which is mounted on a removable wheel of the kind generally in use on motor vehicles. In the embodiment of my invention herein disclosed I have provided an indicator to be placed upon the instrument board of an automobile so that the driver may always be advised as to the pressure of the air in his tires. For convenience of the driver I have illustrated and described an indicator which shows each of the four tires of the motor vehicle. An indication occurs when a change in the air pressure in any one or all of such tires occurs, and a further indication, applicable to all of said tires in unison, occurs when the air inflation reaches a dangerous stage, due either to too much or too little inflation. As is well known, many motorists drive their cars with too little air pressure in their tires, due to a variety of causes such as slow leaks, minute punctures, and the like, and thereby cause damage to the walls of the tire casings. Also, over-inflation may occur, especially in warm weather when a car is driven any long distance, or through carelessness on the part of a filling station attendant. Without an indicator visually convenient to the driver he will not be aware that one or more of his tires may be in distress, either from under-inflation or over-inflation. By my invention the driver is always advised as to the air condition of each tire and whether such condition is normal or dangerous.

Another object of my invention is to so construct and arrange the several parts that the invention can be readily installed in a motor vehicle in such a manner that the wheels of the vehicle can be installed or removed without the necessity of manually connecting or disconnecting the conductors. A still further object is to produce a very simple and effective electrical connecting means so that the electric current may be transmitted positively through a minimum number of parts to the indicator, thus securing in a very practical and relatively inexpensive manner the desired result of advising the driver of the air condition of his tires. My invention is simple to install, and consists of only a small number of essential parts, and once installed and adjusted, no attention to such parts is necessary.

It will be apparent that my invention is broadly applicable to any pressure system where variation of pressure may tend to affect the operation of a device or any system associated with such a device. While I have shown the embodiment of my invention in connection with tires on motor vehicles, I do not wish to be limited to such embodiment where my invention may be applied without substantial modification to other pressure systems.

Fig. 1 is a cross-sectonal view taken through a rear wheel assembly carrying parts of the invention.

Fig. 2 is a front elevation of an indicator to be mounted on the instrument board of a motor vehicle.

Fig. 3 is a cross-section taken on line 3—3 of Fig. 2.

Fig. 7 is a vertical cross-section taken through another form of switch assembly for operating a white or red light indication for under-inflation.

Fig. 8 is a vertical cross-section taken through still another form of switch assembly for operating a white light indication for under-inflation.

Fig. 9 is a vertical cross-section taken through still another form of switch assembly for operating a white light indication for under-inflation and over-inflation, and a red light indication for under-inflation when such under-inflation has reached a dangerous point.

Figure 4:
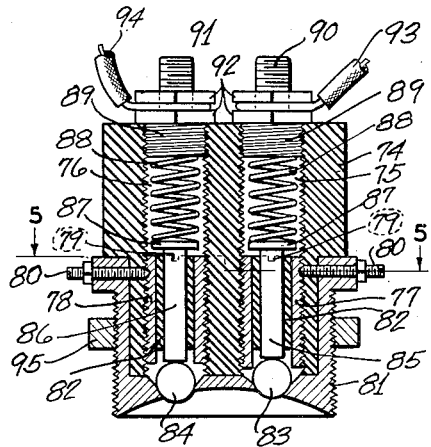
Fig. 4 is a vertical cross-section taken through a switch assembly.
Figure 5:
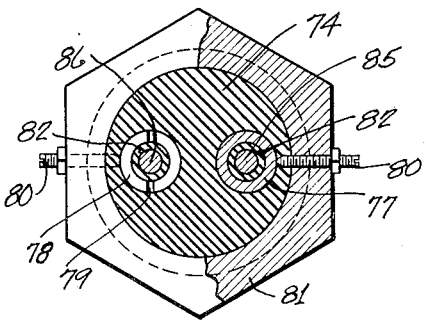
Fig. 5 is a cross-section taken on line 5—5 of Fig. 4.

The drawings show the invention applied to a motor vehicle, but as before stated, the invention can be used in various places wherever it is necessary or desirable to provide means for indicating when the pressure in a member is too low or too high.

In the drawings, A indicates a rear wheel of a motor vehicle, B a tire casing on said wheel, C an inner tube in said tire casing, D the rim of said wheel, E the connecting member between the hub and the rim, F the hub cap, G the brake drum of said wheel. H indicates the hub and I the nut for holding the wheel A on said hub. J indicates a plate secured to the body of the motor vehicle, which plate forms the inner face of the brake drum G. L indicates a non-rotatable sleeve surrounding the axle M and carried by the chassis of the motor vehicle, to which sleeve the plate J is secured by the bolts N. The wheel A is secured to a flange O by bolts P. My switch is indicated by Z.

An indicator K (Fig. 2), comprising a plate 10, is secured to the instrument board of a motor vehicle in any convenient manner, such as by the arms 11 having perforations 12 at the outer extremity of each arm to receive fastening screws (not shown). There are a series of four openings in the plate 10, disposed about the face of said plate. The upper left opening 13 is for the left front tire, the upper right opening 14 is for the right front tire, the lower left opening 15 is for the left rear tire, and the lower right opening 16 is for the right rear tire. Back of each of these openings 13, 14, 15, and 16 are placed light bulbs 17, preferably white, which are used as indication means for the observance of the driver of the motor vehicle. A central opening 18 is also provided in said plate 10, back of which is placed a red light bulb 19, also as indication means to the driver of the motor vehicle. These lights 17 and 19 are shown in Fig. 3 appropriately mounted in conventional sockets 20.

I will now describe each of the several switches illustrated in the drawings. The switch shown in Fig. 8 is a single switch adapted to operate only a white light 17 in the indicator K when a tire is under-inflated. A circular casing member 21 formed of non-conducting material is longitudinally bored as at 22, having an interiorly threaded upper portion 23 and a lower portion 24 of reduced diameter pressed into a metallic bushing 25, which bushing has an annular flange 26 thereon to serve as a seat for the casing 21. A nut 27 is screwed on the exteriorly threaded portion 28 of said bushing 25. The purpose of the nut 27 is to limit the longitudinal movement of the bushing 25 through the rim D of the wheel A of a motor vehicle. The bushing 25 is screwed into the rim D. At the lower interior end of the bushing 25 is an annular shoulder 29 which forms a seat on one side for one end of the circular casing member 21, the opposite face being concave as shown at 30, against which concave face the inflated inner tire tube C is adapted to press. The bushing 25 is secured on the circular casing member 21 by a screw 31. When the nut 27 has been properly located with respect to the rim D it may be locked in position in any conventional manner. The annular shoulder 29 has a beveled seat, as shown at 32, to receive a metal ball 33 located in the bore 22. A coiled metal spring 34 is located around a metal rod 35 in the bore 22 which depends from a threaded plug 36 in the upper threaded end of the casing 21. A terminal post 37 projects outwardly from the plug 36 and two nuts are threaded thereon to engage therebetween a wire (not shown) for conducting an electric current. When the switch shown in Fig. 8 is employed, the inflated inner tube C in the tire casing B presses against the ball 33, which moves it away from its beveled seat 32 against the pressure of the spring 34, thus opening the electric circuit between the switch and the indicator light in the indicator K, which circuit will be hereinafter more fully described. In the event the inner tube begins to become deflated, the ball 33 is permitted thereby to approach its seat 32, and when it contacts said seat the electric circuit is closed and a white light 17 in the indicator K is caused to glow.

I will now describe the switch shown in Fig. 7. This switch operates the white lights 17 and the red light 19 in the indicator K. A cylindrical, non-conducting casing 39 formed with the larger diameter 40 is seated on the metal bushing 41. The lower end of the casing member 39 is of reduced diameter as at 42 and is pressed into a bore in the metal bushing 41, and is secured therein by the screw 43. The inner end 42 of the casing 39 abuts against a shoulder 44 formed interior of the bushing 41. A nut 45 is threaded upon the bushing 41 and serves to position the switch in the rim D of the wheel A when the bushing 41 is screwed into the rim D. This nut 45, when once positioned, can be appropriately locked in place in any conventional manner. Two beveled seats 46 and 47 are in the lower end 48 of the bushing 41 and are adapted to receive the two metal balls 49 and 50 placed in the bores 50' in the casing 39. These balls are each contacted by coil springs 51, which press said balls toward the seats 46 and 47. The other ends of the springs 51 contact plugs 52 threaded into the threaded end of the casing 39. These springs surround the posts 53 and 54 which are located in the bores 50' and are connected to the plugs 52. Terminal posts 55 and 56 project from the plugs 52, and thereon are the nuts 57 which engage therebetween the electric wires (not shown) to be attached to such terminal posts. The inner tube C of the tire A presses up against the balls 49 and 50 when such tube is inflated, and this causes such balls to be pressed away from their seats 46 and 47. When loss of inflation occurs the ball 49 first seats and closes the electric circuit, to be hereinafter described, and causes a white light 17 in the indicator K to glow, then if further deflation occurs the other ball 50 will seat at 47 and close a circuit leading to the red light 19 in the indicator K, causing it to glow and thereby informing the driver of the vehicle that under-inflation has progressed to such an extent that immediate attention to the tire indicated is required.

The switch shown in Fig. 9 is for under-inflation and over-inflation, and the operation of the red light 19 in the indicator K for under-inflation only. This switch is identical with the switch shown in Fig. 7, with the exception of the right-hand portion. A metal ball 58 is fitted into a beveled seat 59 in the lower end of the metal bushing 60. One end of a metal rod 61 in the bore 64 in the non-conducting casing member 65 contacts the ball 58, also in said bore 64. The rod 61 passes through a tube 62, which is of non-conducting material. This tube is contained in the larger metal tube 63, which is threaded into the interior of a longitudinal bore 64 in the casing 65 which is of non-conducting material. The metal tube 63 is secured by the screw 66 passing through the bushing 60. A metal coil spring 67 is mounted in the bore 64 between a plug 68 and the head 69 of the metal rod 61. The plug 68 has the terminal post 70 extending upwardly therefrom with the two wire-engaging nuts 71 thereon. This switch is held in adjusted position, when screwed into the rim D of the wheel A, by the nut 72, which may be locked in place in any conventional way. When an inner tube is properly inflated both the ball 58 controlling the white lights 17 and the ball 73 controlling the red light 19 are raised off their beveled seats in the lower end of the metal bushing 60, the ball 58 being just out of contact with the lower end of the metal tube 63. If under-inflation due to an air leak or a puncture occurs, first the ball 58 seats in the seat 59, when the electric circuit to a white light in the indicator K is closed and said light is caused to glow. Further deflation causes the ball 73 to seat and thus close the red light circuit, and the red light in the indicator K is caused to glow. This red light indication informs the driver of the vehicle that immediate attention to the tire indicated by the white light is imperative. If the tire becomes over-inflated, the ball 58 will be raised by the inner tube contact to a point where said ball will contact the end of the meal tube 63, thus closing the electric circuit to a white light in the indicator K. Thus the driver of the vehicle is warned that the tire indicated is either under-inflated or over-inflated, and at the first opportunity said tire should be examined and the real condition noted. Ordinarily a tire will not become over-inflated except on a long run in warm weather, or careless inflation by a filling station attendant.

The switch shown in Fig. 4 controls the light circuits for both over-inflation and under-inflation. The non-conducting casing 74 has two longitudinal bores 75 and 76, interiorly threaded, and the threaded metal tubes 77 and 78 are located therein, extending from about the center of the casing 74 to a point near one end thereof. For convenience in adjusting these tubes 77 and 78 a notch 79 to receive a screw driver may be placed in the end thereof near the middle of the casing 74. These tubes 77 and 78 are secured by the screws 80 passing through a metal bushing 81. It will be noted in the switch shown in Fig. 4 and the switch shown in Fig. 9 that the screws 80 and the screw 66 pass through the non-conducting casings 74 and 65, respectively, thus securely holding the casing and the metal bushing together.

Within the metal tubes 77 and 78 are placed the non-conducting tubes 82 so that the electric circuit controlling the lights in the indicator K will remain open until the balls 83 or 84 contact the metal tubes 77 or 78 on over-inflation of a tire, thus closing the circuit. Within the non-conducting tubes 82 are the metal rods 85 and 86 provided with heads 87 against which presses one end of a metal coiled spring 88, the other end pressing against a threaded plug 89, one for each longitudinal bore 75 and 76. These plugs 89 have upwardly extending terminal posts 90 and 91 with wire-holding nuts 92 threaded thereon. Wires 93 and 94 lead through various electrical connecting means from the contact posts 90 and 91 to the white and red light bulbs 17 and 19, respectively, in the indicator K. The switch shown in Fig. 4 is held in adjusted position in the tire rim D when screwed therein by the nut 95 which may be locked in place in any conventional manner. Normally the electric circuit is open when the balls 83 and 84 are out of contact with the bushing 81 and the metal tubes 77 and 78.

Figure 6:
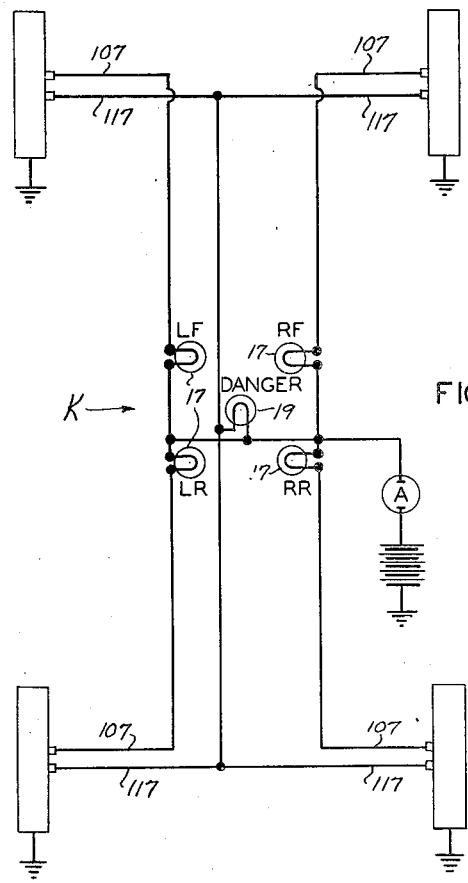
Fig. 6 is a wiring diagram.

In the diagrammatic view shown in Fig. 6 the wire circuits from the wheel switches Z to the ammeter and the battery and to the light bulbs is shown, the circuits being grounded through the wheels and the chassis. The wire 107 leads from the switches Z controlling the white lights 17 and the wire 117 leads from the switches Z controlling the red light 19. It is believed that Fig. 6 is practically self-explanatory.

In Fig. 1 I have illustrated the electric circuits passing from the switches Z through the wires 93 and 94, respectively. The wire 93 connects with the terminal post 55 and leads to a contact member 98 carried by the connecting member E of the wheel A. The contact member 98 is secured to the member E by the screws 99 to one of which the wire 93 is attached. The contact member 98 is bent at an angle and one end extends inwardly toward the hub of the wheel and has a plane face for contact with a terminal post 100, which extends through one wall of the brake drum G. A wire 101 is connected to the inner end of the post 100 and leads to a collector ring or band 102. Insulation 103 is provided between the wire 101 and the band 102, the only metallic contact therebetween being through the screw 104, to which said wire is attached as also to the collector band 102. The non-rotating plate J of the brake drum G has mounted therein the brush contact plunger 105, which is held by a metal coiled spring 106 in contact with the collector band 102, so that as the collector band turns the plunger 105 rubs against the same and can transmit any current passing through said collector band 102 to the light bulbs 17 in the indicator K by means of the wire 107. The spring 106 and the brush plunger 105 are held in the tubular casing 108 threaded through the plate J. The brush contact plunger 109 presses against the collector band 110, which is in contact through the post 111 with the angularly shaped, plane-faced member 112, which is in contact with the wire 94 leading from the switch Z and the wire 117 leading to the red light in the indicator K. Each brush is insulated from the plate J through which it passes by the insulation 113, so that the only electric contact is through the threaded metallic body 114 to which the wire 107 is attached. Each brush is formed of a tubular, exteriorly threaded body having a longitudinal bore therein extending substantially throughout the length of said member and with a coiled metallic spring 106 therein located between one end of said bore and a head 115 on a contact plunger 105, which keeps said contact plunger of said brush pressed outwardly in positive contact with the collector band 102. A screw 116 in the end of the bored member attaches the wire 107 to said brush. Each brush is of identically the same construction as the other. All of the bulbs of the sockets in the indicator K are electrically connected with the ammeter (indicated by the letter A in a circle in Fig. 6), which is electrically connected with the battery. Thus if the pressure in the left front tire, for instance, should be reduced to a certain extent, the spring 51 (Fig. 7) would press its ball 49 against the seat 46, which would complete the circuit from the battery through the lamp at the upper left in the indicator K, through the conductor 96, contact member 98, a collector band 102, a brush 105, wire 107. This would indicate to the operator that the tire of the left front wheel was partly deflated. Then if the tire was not inflated and continued to deflate, the weaker spring of the other switch would force its ball 50 upon its seat 47 (see Fig. 7) and then the circuit to the danger lamp would be closed, and then the operator would know that the tire has become deflated to the danger point. By this simple means a wheel may be readily removed from and returned to the axle of a motor vehicle without manually disconnecting any of the electric conduits leading from the switch carried by said tire to the light bulbs on the instrument board and the battery of the motor vehicle. This is of the greatest importance, as it is only necessary for the one changing a wheel to see that the wheel is placed in proper position so that the contact parts 98, 100, 111, and 112 are in correct position, everything else being automatically taken care of.

It will be noted that each switch can be adjusted by manipulation of the screw-threaded parts so that just the right amount of inflation of the tire will be correctly indicated and just what amount of under-inflation or over-inflation is to be noted on the indicator K. Once this has been established, no further attention need be paid to the switches.

It should be noted that the spring pressing against the ball in the bore of each switch that indicates under-inflation is preferably made stronger than the spring that presses against the ball in the bore that indicates over-inflation.

I claim:

1. In a switching device of the kind described for a rotatable wheel having a rim and inflated tire thereon, a bushing extending through an opening in the rim and having a bottom part contacting the inflated tire, a seat formed in the bushing, a body of non-conducting material having an annular shoulder engaging an annular flange at the upper end of the bushing to thereby form a seat and support for the non-conducting body, said body having a longitudinal bore therein, a plug having a terminal post mounted in one end of the bore, a ball member in the bore, and spring means in the bore tending to press the ball member against the seat, the ball member closing an electric circuit when seated and interrupting the electric circuit when unseated by pressure of the inflated member against the ball.

2. In a switching device of the kind described for a rotatable wheel having a rim and inflated tire thereon, a bushing extending through the opening in the rim and having a bottom part contacting the inflated tire, seats formed in the bushing, a body of non-conducting material supported by the bushing and having a pair of bores therein, plugs having terminal posts mounted in one end of the bore, ball members in the bores, and spring means in the bore tending to press the ball members against their seats, one of the bores having a metal sleeve therein which is insulated from the spring means and electrically connected with the bushing, said metal sleeve being contacted by the ball to close a circuit when the pressure in the inflated member is excessive.

3. In a switching device of the kind described for a rotatable wheel having a rim and inflated tire thereon, a bushing extending through an opening in the rim and having a bottom part provided with a pair of holes, the walls of which form seats, a body of insulating material having an annular shoulder engaging an annular flange at the upper end of the bushing to thereby form a seat and support for the non-conducting body, said body having therein a pair of bores, each of which is in communication with one of the holes, ball members in the bores, spring means tending to hold the ball members on their seats, said ball members being forced from their seats when the tire is inflated, one of the spring means being stronger than the other whereby the balls are seated under different inflation pressures.

4. In a switching device of the kind described for a rotatable wheel having a rim and inflated tire thereon, a bushing carried by the rim and having a bottom part provided with a pair of holes, the walls of which form seats, a body of non-conducting material carried by the bushing and having a pair of bores therein in communication with the holes, a plug in the outer end of each bore, a terminal post connected to each plug, a rod connected to the inner face of each plug and extending into the bore, but spaced from the inner end of said bore, a ball in each bore, a spring surrounding the rod tending to hold the balls upon their seats, and means for closing a circuit when a ball engages its seat, one spring being stronger than the other whereby one circuit is closed before the other.

5. In a switching device of the kind described for a rotatable wheel having a rim and inflated tire thereon, a bushing extending through an opening in the rim and having a bottom part contacting the inflated tire, a pair of seats formed in the bushing, a body of non-conducting material supported by the bushing and having a pair of bores therein, a plug in the outer end of each bore and each having a terminal post connected thereto, springs in each bore, a metal sleeve in each bore and being spaced above the normal position of the balls, sleeves of non-conducting material placed in the metal sleeves and having their inner ends terminating in spaced relation to the inner ends of the metal sleeves, and a plunger in each sleeve of non-conducting material and engaged by the springs, said balls engaging the metal sleeves when the tire is over-inflated to thereby complete an electric circuit.

ALLIE EDMONSTON.